(12) United States Patent
Terada et al.

(10) Patent No.: US 11,467,944 B2
(45) Date of Patent: Oct. 11, 2022

(54) INFORMATION PROCESSING APPARATUS, TUNING METHOD, AND COMPUTER READABLE MEDIUM

(71) Applicant: MITSUBISHI ELECTRIC CORPORATION, Tokyo (JP)

(72) Inventors: Yurika Terada, Tokyo (JP); Akio Idehara, Tokyo (JP); Takehisa Mizuguchi, Tokyo (JP); Ryohei Kuba, Tokyo (JP); Shinichi Ochiai, Tokyo (JP); Hiroki Konaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 136 days.

(21) Appl. No.: 17/019,715

(22) Filed: Sep. 14, 2020

(65) Prior Publication Data

US 2020/0409821 A1 Dec. 31, 2020

Related U.S. Application Data

(63) Continuation of application No. PCT/JP2018/017667, filed on May 7, 2018.

(51) Int. Cl.
*G06F 11/36* (2006.01)
*G06F 9/455* (2018.01)

(52) U.S. Cl.
CPC ...... *G06F 11/3612* (2013.01); *G06F 9/45558* (2013.01); *G06F 2009/45591* (2013.01)

(58) Field of Classification Search
CPC ............. G06F 11/3612; G06F 9/45558; G06F 2009/45591

(Continued)

(56) References Cited

U.S. PATENT DOCUMENTS 6,615,166 B1 * 9/2003 Guheen .................. G06Q 10/06
                                                          703/27
7,899,069 B2 * 3/2011 Gorti ...................... H04L 47/30
                                                          370/415

(Continued)

FOREIGN PATENT DOCUMENTS

EP      2 833 264 A1    2/2015
JP      2008-176482 A   7/2008

(Continued)

OTHER PUBLICATIONS

Browne, Shirley, et al. "A scalable cross-platform infrastructure for application performance tuning using hardware counters." SC'00: Proceedings of the 2000 ACM/IEEE Conference on Supercomputing. IEEE, 2000.pp.1-13. (Year: 2000).*

(Continued)

*Primary Examiner* — Satish Rampuria
(74) *Attorney, Agent, or Firm* — Birch, Stewart, Kolasch & Birch, LLP

(57) ABSTRACT

In an information processing apparatus (100), obtaining units such as a first obtaining unit (200) and a second obtaining unit (230) obtain general-purpose OS information in a test operation phase in which a real-time application and a plurality of general-purpose applications are executed. The general-purpose OS information is information on use of hardware by each of the plurality of general-purpose applications executed in the test operation phase. A management unit (220) verifies whether or not a condition to place a restriction on the use of the hardware is satisfied for each general-purpose application based on the general-purpose OS information obtained by the obtaining unit. The management unit (220), when the condition is verified as being satisfied, places a restriction on the use of the hardware for an applicable general-purpose application in an actual opera- (Continued)

tion phase in which the real-time application and the plurality of general-purpose applications are executed.

13 Claims, 15 Drawing Sheets

(58) Field of Classification Search
USPC .................................................. 717/124–168
See application file for complete search history.

(56) References Cited

U.S. PATENT DOCUMENTS

| | | | | |
|---|---|---|---|---|
| 8,010,719 | B2* | 8/2011 | Moriki | G06F 13/28 710/39 |
| 8,429,630 | B2* | 4/2013 | Nickolov | H04L 67/10 717/148 |
| 10,452,440 | B1* | 10/2019 | Odulinski | G06F 9/485 |
| 2001/0011358 | A1* | 8/2001 | Ochiai | G06F 11/0775 714/45 |
| 2006/0005199 | A1* | 1/2006 | Galal | G06F 9/461 718/108 |
| 2007/0240136 | A1* | 10/2007 | Garyali | G06F 9/468 717/140 |
| 2008/0172499 | A1 | 7/2008 | Moriki et al. | |
| 2009/0198766 | A1 | 8/2009 | Chen et al. | |
| 2011/0289502 | A1 | 11/2011 | Moriki et al. | |
| 2012/0159640 | A1* | 6/2012 | Cox | G06F 21/335 726/27 |
| 2015/0363220 | A1 | 12/2015 | Yamada et al. | |
| 2019/0303172 | A1 | 10/2019 | Takahashi et al. | |

FOREIGN PATENT DOCUMENTS

| | | |
|---|---|---|
| JP | 2009-181578 A | 8/2009 |
| JP | 2009-239374 A | 10/2009 |
| JP | 6250233 B1 | 12/2017 |
| WO | WO 2013/145199 A1 | 10/2013 |
| WO | WO 2014/118969 A1 | 8/2014 |
| WO | WO 2018/092206 A1 | 5/2018 |

OTHER PUBLICATIONS

Dhodapkar, Ashutosh S., and James E. Smith. "Managing multi-configuration hardware via dynamic working set analysis." Proceedings 29th Annual International Symposium on Computer Architecture. IEEE, 2002.pp.1-12. (Year: 2002).*

Nightingale, Edmund B., et al. "Helios: heterogeneous multiprocessing with satellite kernels." Proceedings of the ACM SIGOPS 22nd symposium on Operating systems principles. 2009.pp.221-234. (Year: 2009).*

Chen, Tianqi, et al. "{TVM}: An automated {End-to-End} optimizing compiler for deep learning." 13th USENIX Symposium on Operating Systems Design and Implementation (OSDI 18). 2018. pp.579-594 (Year: 2018).*

Chi, Eric, et al. "Combining software and hardware monitoring for improved power and performance tuning." Seventh Workshop on Interaction Between Compilers and Computer Architectures, 2003. INTERACT-7 2003. Proceedings.. IEEE, 2003.pp.1-8 (Year: 2003).*

Albonesi, David H., et al. "Dynamically tuning processor resources with adaptive processing." Computer 36.12 (2003): pp. 49-58. (Year: 2003).*

International Search Report for PCT/JP2018/017667 (PCT/ISA/210) dated Jul. 17, 2018.

* cited by examiner

Fig. 6

| ID | APPLICATION NAME | EXECUTION TIME OF APPLICATION | DMA PROCESS START TIME | DMA PROCESS END TIME | NUMBER OF DMA PROCESSES | DMA TRANSFER SIZE | CPU USAGE RATE | DISC ACCESS TIME | COMMENTS |
|---|---|---|---|---|---|---|---|---|---|
| 1 | XXXX.exe | 10ms | 0x10 | 0x20 | 3 | 8KB | 80.0% | 1ms | |
| ... | ... | ... | ... | ... | ... | ... | ... | ... | ... |

Fig. 7

| No. | CATEGORY | TUNING METHOD | EXECUTION CONDITION |
|---|---|---|---|
| 1 | CPU | REDUCE CPU FREQUENCY | CPU USAGE RATE IS 70% OR MORE |
| 2 | DMA | MAKE TRANSMISSION SIZE PER TRANSFER OF DMA TRANSFER SMALL | DMA TRANSFER TIME IS EQUAL TO OR MORE THAN INTERRUPT CYCLE OF RTOS (+20% OR LESS) |
| 3 | DMA | CONVERT ALL DMA TRANSFER TO PIO | DMA TRANSFER TIME IS EQUAL TO OR MORE THAN INTERRUPT CYCLE OF RTOS (+20% OR MORE) |
| 4 | DISC | MAKE BLOCK SIZE OF DISC ACCESS SMALL | DISC ACCESS TIME IS EQUAL TO OR MORE THAN INTERRUPT CYCLE OF RTOS |
| ... | ... | ... | ... |

| ID | APPLICATION NAME | EXECUTION TIME OF APPLICATION | CPU USAGE RATE | TUNING METHOD | PARAMETER |
|---|---|---|---|---|---|
| 1 | XXXX.exe | YYms | AA% | REDUCE CPU FREQUENCY | αHz |
| ... | ... | ... | ... | ... | ... |

303

INFORMATION PROCESSING APPARATUS, TUNING METHOD, AND COMPUTER READABLE MEDIUM

CROSS REFERENCE TO RELATED APPLICATION

This application is a Continuation of PCT International Application No. PCT/JP2018/017667, filed on May 7, 2018, which is hereby expressly incorporated by reference into the present application.

TECHNICAL FIELD

The present invention relates to an information processing apparatus, a tuning method, and a tuning program.

BACKGROUND ART

With developments in virtualization technology due to improved CPU performance in recent years, it is possible to install a plurality of OS's in one information processing system. On such an information processing system with the plurality of OS's installed, software that manages operation of each OS is called a hypervisor. OS operated is called a guest OS. Technology that operates the plurality of OS's on a single hardware platform by using the hypervisor is also used in an embedded system. On such a system, an environment that simultaneously executes a real-time OS that performs a highly real-time process and a general-purpose OS such as Windows (registered trademark) and the like that performs an information process is used. These OS's, however, are using the same hardware. Consequently, there is a case where a bus is made busy for a long time depending on contents of a process of the general-purpose OS. As a result, there is a possibility of overhead being occurred for a rea-time response performance of the real-time OS. "CPU" is an abbreviation for Central Processing Unit. "OS" is an abbreviation for Operating System.

In Patent Literature 1, in a case where a DMA flow rate of a virtual server with a low priority is higher than a threshold set in advance, technology to make a virtual server with a high priority accessing an I/O possible by reducing CPU time allotted, is described. "DMA" is an abbreviation for Direct Memory Access. "I/O" is an abbreviation for Input/Output.

CITATION LIST

Patent Literature

Patent Literature 1: JP 2008-176482 A

SUMMARY OF INVENTION

Technical Problem

In the technology described in Patent Literature 1, by reducing the CPU time allotted to the virtual server with a low priority, a process of the virtual server with a low priority that does not affect another virtual server is also stopped.

The present invention aims to enable a real-time OS preferentially access hardware without stopping a process of an OS other than the real-time OS that does not affect a process of the real-time OS.

Solution to Problem

An information processing apparatus according to one aspect of the present invention includes:

hardware;

an obtaining unit to obtain, in a test operation phase in which a real-time application that is an application program that operates with a real-time operating system by using the hardware, and a plurality of general-purpose applications, each of which is an application program that operates with a non-real-time operating system by using the hardware, are executed, general-purpose OS information that is information on use of the hardware by each of the plurality of general-purpose applications; and a management unit to verify whether or not a condition to place a restriction on the use of the hardware is satisfied for each general-purpose application based on the general-purpose OS information obtained by the obtaining unit, and when the condition is verified as being satisfied, to place a restriction on the use of the hardware for an applicable general-purpose application in an actual operation phase in which the real-time application and the plurality of general-purpose applications are executed.

Advantageous Effects of Invention

In the present invention, of the applications that operate on the OS other than the real-time OS, use of hardware is restricted in an actual operation phase in an application that is verified as satisfying a certain condition based on information obtained in a test operation phase. By not restricting an application verified as not satisfying the condition the use of the hardware in the actual operation phase, the real-time OS can be made to preferentially access the hardware without stopping the process of the OS other than the real-time OS that does not affect the process of the real-time OS.

BRIEF DESCRIPTION OF DRAWINGS

FIG. 6 is a diagram illustrating an example of a general-purpose OS information table of the information processing apparatus according to Embodiment 1.

FIG. 7 is a diagram illustrating an example of a threshold table of the information processing apparatus according to Embodiment 1.

FIG. 8 is a diagram illustrating an example of a tuning table of the information processing apparatus according to Embodiment 1.

DESCRIPTION OF EMBODIMENTS

Embodiments of the present invention will be described hereinafter using the drawings. Throughout the drawings, the same or corresponding portions are denoted by the same reference signs. In the description of the embodiments, description of the same or corresponding portions will be suitably omitted or simplified. Note that the present invention is not limited to the embodiments to be described hereinafter, and various modifications are possible as necessary. For example, two or more embodiments of the embodiments to be described hereinafter may be implemented in combination. Alternatively, one embodiment or a combination of two or more embodiments of the embodiments to be described hereinafter may be partially implemented.

Embodiment 1

This embodiment will be described using FIG. 1 to FIG. 13.

*Description of Configuration*

A configuration of an information processing apparatus 100 according to this embodiment will be described by referring to FIG. 1 to FIG. 3.

The information processing apparatus 100 is a computer that makes a plurality of OS's operate.

Figure 1:
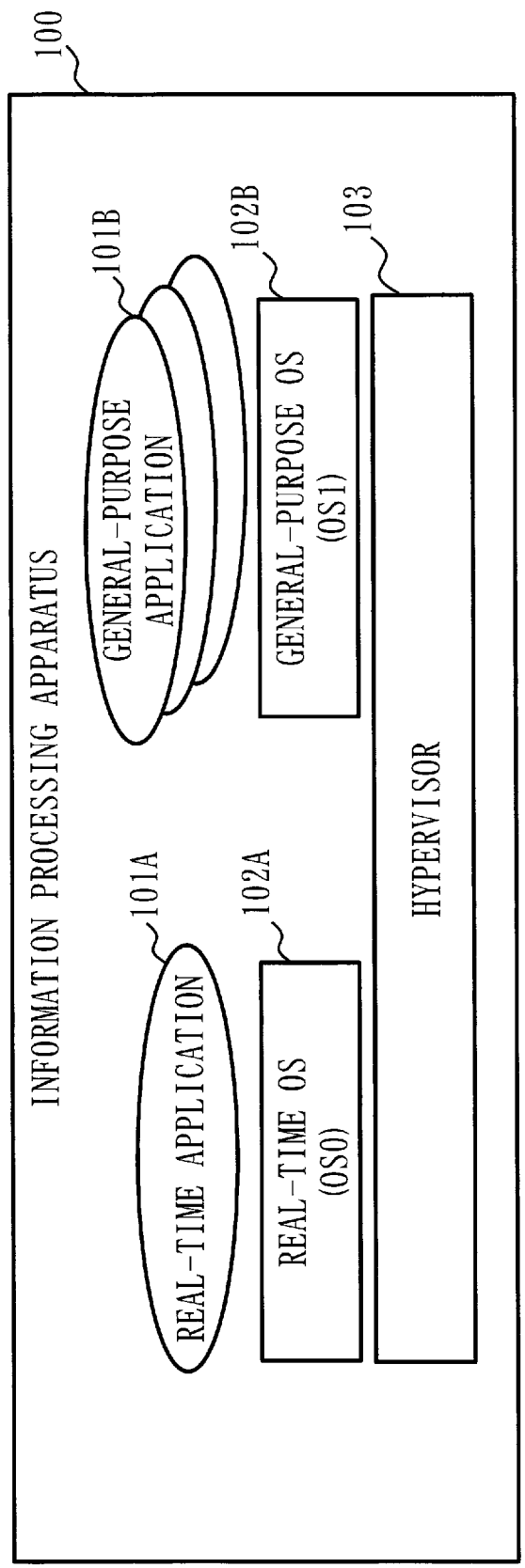
FIG. 1 is a block diagram illustrating a software configuration of an information processing apparatus according to Embodiment 1.

As illustrated in FIG. 1, software such as a real-time application 101A, a plurality of general-purpose applications 101B, a real-time OS 102A, a general-purpose OS 102B, and a hypervisor 103 operate in the information processing apparatus 100.

The real-time application 101A is an application program that operates using hardware with the real-time OS 102A. Each of the plurality of general-purpose applications 101B is an application program that operates using the hardware with the general-purpose OS 102B. The general-purpose OS 102B is a non-real-time OS. The hypervisor 103 corresponds to a tuning program according to this embodiment.

Figure 2:
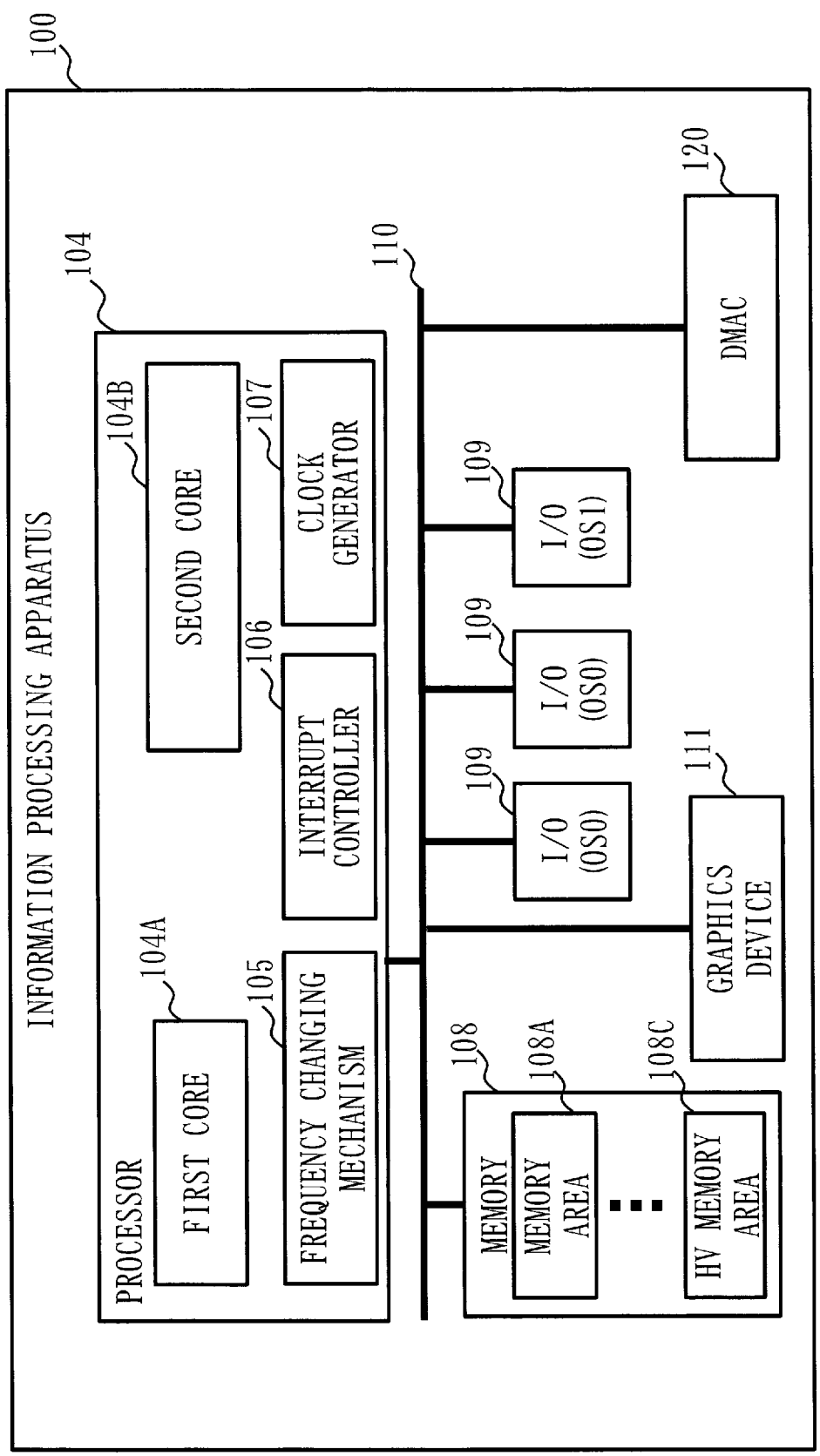
FIG. 2 is a block diagram illustrating a hardware configuration of the information processing apparatus according to Embodiment 1.

As illustrated in FIG. 2, the information processing apparatus 100 includes a plurality of types of hardware such as a processor 104, a memory 108, an I/O device 109, a graphics device 111, and a DMA controller 120. The processor 104 is connected to other hardware such as the memory 108, the I/O device 109, the graphics device 111, and the DMA controller 120 via a bus 110, and controls these other hardware. These hardware connected via the bus 110 can perform transmission/reception and the like of data with each other under management of the processor 104.

Figure 3:
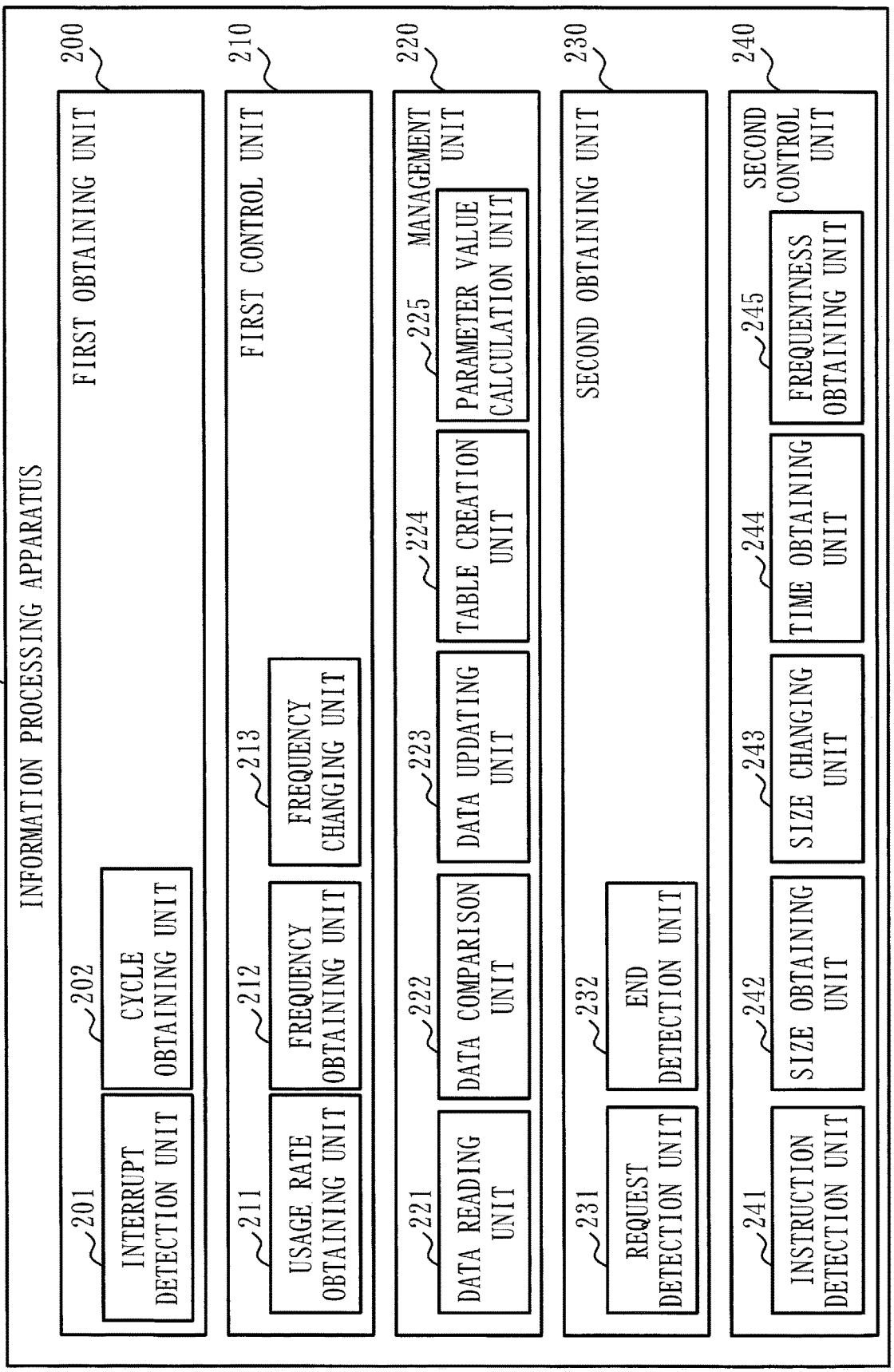
FIG. 3 is a block diagram illustrating a functional configuration of the information processing apparatus according to Embodiment 1.

As illustrated in FIG. 3, the information processing apparatus 100 includes, as functional elements, a first obtaining unit 200, a first control unit 210, a management unit 220, a second obtaining unit 230, and a second control unit 240. The first obtaining unit 200 includes an interrupt detection unit 201 and a cycle obtaining unit 202. The first control unit 210 includes a usage rate obtaining unit 211, a frequency obtaining unit 212, and a frequency changing unit 213. The management unit 220 includes a data reading unit 221, a data comparison unit 222, a data updating unit 223, a table creation unit 224, and a parameter value calculation unit 225. The second obtaining unit 230 includes a request detection unit 231 and an end detection unit 232. The second control unit 240 includes an instruction detection unit 241, a size obtaining unit 242, a size changing unit 243, a time obtaining unit 244, and a frequentness obtaining unit 245.

Functions of the first obtaining unit 200, the first control unit 210, the management unit 220, the second obtaining unit 230, and the second control unit 240 are realized by software. Specifically, the functions of the first obtaining unit 200, the first control unit 210, the management unit 220, the second obtaining unit 230, and the second control unit 240 are realized by the hypervisor 103. The hypervisor 103 is a program that makes a computer execute procedures performed by the first obtaining unit 200, the first control unit 210, the management unit 220, the second obtaining unit 230, and the second control unit 240 as a first obtaining procedure, a first control procedure, a management procedure, a second obtaining procedure, and a second control procedure, respectively. The hypervisor 103 may be provided being recorded in a computer-readable medium or provided being stored in a recording medium, or provided as a program product.

The processor 104 is a device that executes software such as the real-time application 101A, the plurality of general-purpose applications 101B, the real-time OS 102A, the general-purpose OS 102B, and the hypervisor 103. The processor 104 is specifically, a multi-core CPU.

The processor 104 includes a first core 104A and a second core 104B.

The first core 104A makes the hypervisor 103, the real-time OS 102A, and the real-time application 101A operate. The second core 104B makes the general-purpose OS 102B and the general-purpose application 101B operate.

The processor 104 further includes a frequency changing mechanism 105, an interrupt controller 106, and a clock generator 107 as hardware.

The frequency changing mechanism 105 is a mechanism that changes operating frequency of the second core 104B that the general-purpose application 101B uses by controlling the clock generator 107. The interrupt controller 106 is a device that detects an interrupt from the I/O device 109 and makes an interrupt signal occur for guest OS's such as the real-time OS 102A and the general-purpose OS 102B. The clock generator 107 is a device that generates a clock signal that corresponds to the operating frequency.

The memory 108 is a device that stores software such as the real-time application 101A, the plurality of general-purpose applications 101B, the real-time OS 102A, the general-purpose OS 102B, and the hypervisor 103. The memory 108 is, for example, a RAM, a flash memory, or a combination of these. "RAM" is an abbreviation for Random Access Memory.

The memory 108 includes an HV memory area 108C needed for data management of the hypervisor 103 and other memory area 108A.

The I/O device 109 is an input device or a display. The input device is a device operated by a user for inputting data into software such as the real-time application 101A, the plurality of general-purpose applications 101B, the real-time OS 102A, the general-purpose OS 102B, and the hypervisor 103. The input device is, for example, a mouse, a keyboard, a touch panel, or a combination of some or all of these. The display is a device that displays on a screen data outputted from software such as the real-time application 101A, the plurality of general-purpose applications 101B, the real-time OS 102A, the general-purpose OS 102B, and the hypervisor 103. The display is, for example, an LCD. "LCD" is an abbreviation for Liquid Crystal Display.

The graphics device 111 is a device that outputs an image to the display. The graphics device 111 is, for example, a graphics card.

The DMA controller 120 is a device that executes a DMA process.

Software such as the real-time application 101A, the plurality of general-purpose applications 101B, the real-time OS 102A, the general-purpose OS 102B, and the hypervisor 103 are read into the processor 104 from the memory 108 and executed by the processor 104.

Software such as the real-time application 101A, the plurality of general-purpose applications 101B, the real-time OS 102A, the general-purpose OS 102B, and the hypervisor 103 may be stored in an auxiliary storage device. The auxiliary storage device is, for example, an HDD, a flash memory, or a combination of these. "HDD" is an abbreviation for Hard Disk Drive. When stored in the auxiliary storage device, software is loaded into the memory 108 and executed by the processor 104.

The information processing apparatus 100 may include a plurality of processors that replace the processor 104. These plurality of processors share execution of software. Each processor is, specifically, a single-core CPU or a multi-core CPU.

Data, information, signal values, and variable values used, processed, or outputted by software such as the real-time application 101A, the plurality of general-purpose applications 101B, the real-time OS 102A, the general-purpose OS 102B, and the hypervisor 103 are stored in the memory 108, the auxiliary storage device, or a register or a cache memory in the processor 104.

Figure 4:
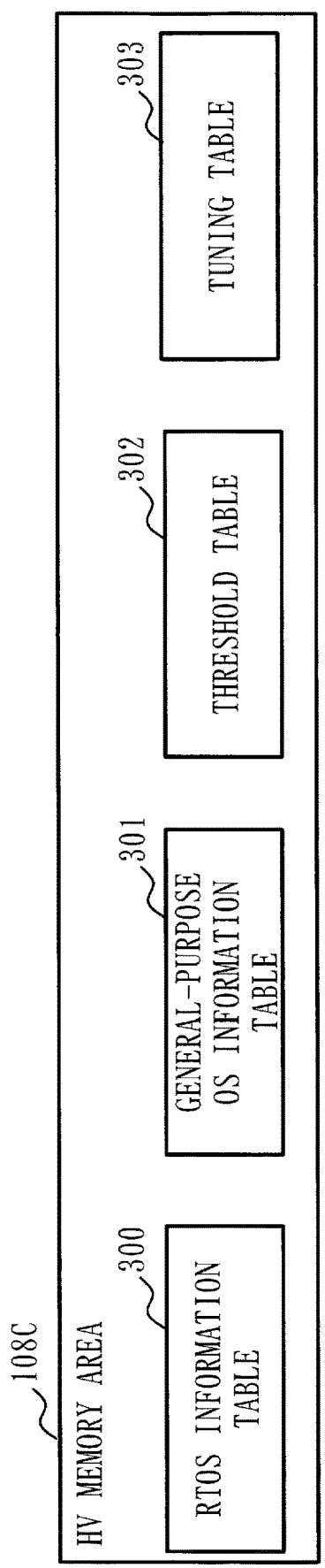
FIG. 4 is a block diagram illustrating a group of tables in an HV memory area of the information processing apparatus according to Embodiment 1.

A group of tables stored in the HV memory area 108C that the hypervisor 103 is to use will be described by referring to FIG. 4.

Four tables necessary for placing a restriction on an execution method of an application that the general-purpose OS 102B executes are stored in the HV memory area 108C. Specifically, an RTOS information table 300, a general-purpose OS information table 301, a threshold table 302, and a tuning table 303 are stored. "RTOS" is an abbreviation for Real-Time Operating System.

The RTOS information table 300, the general-purpose OS information table 301, and the threshold table 302 are tables that a user who is a developer of a system creates. The tuning table 303 is a table that the hypervisor 103 creates.

The RTOS information table 300 is a table that designates an application name that is a target from which information of an interrupt cycle of the real-time OS 102A is collected. Data collected by the data updating unit 223 is saved in the RTOS information table 300.

The general-purpose OS information table 301 is a table that designates information that is wanted to be obtained from the general-purpose OS 102B. By designating the application name that is the target, the data collected by the data updating unit 223 is saved in the general-purpose OS information table 301.

The threshold table 302 is a table that records, at a time of placing a restriction on a process of the general-purpose OS 102B, whether or not the process is a restriction target, and a threshold for determining how to place a restriction on the process when the process is the restriction target. Whether or not a process is a restriction target is determined by whether or not the process satisfies an execution condition. The threshold table 302, specifically, is a table that designates a method for executing a placement of a restriction at a time of placing a restriction on a process of the general-purpose OS 102B and an execution condition for the restriction.

The tuning table 303 is a table that records a result calculated by the hypervisor 103 on how tuning is to be performed for a process of the restriction target. A value of the restriction set in the threshold table 302 is recorded in the tuning table 303.

Figure 5:
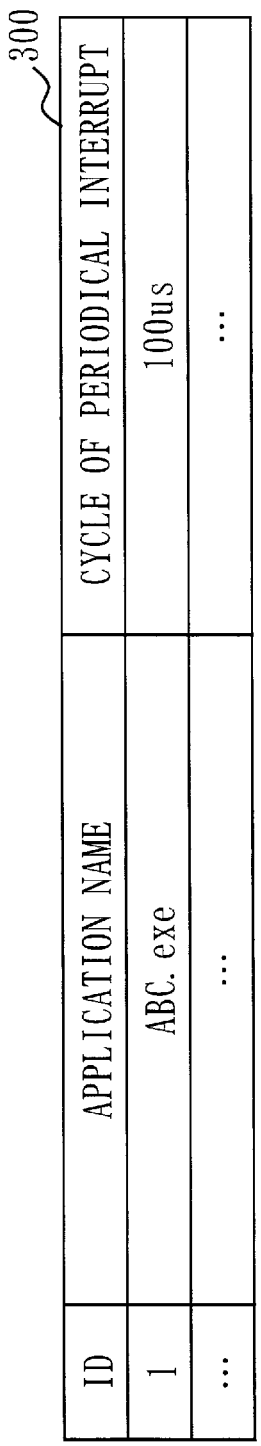
FIG. 5 is a diagram illustrating an example of an RTOS information table of the information processing apparatus according to Embodiment 1.

An example of the RTOS information table 300 is illustrated in FIG. 5. In this example, a real-time application 101A, "ABC.exe", to be used in the real-time OS 102A is designated. And, information on an interrupt cycle collected of the real-time application 101A designated is saved.

An example of the general-purpose OS information table 301 is illustrated in FIG. 6. It is possible for a user to designate an arbitrary item in the general-purpose OS information table 301. To determine a load state of an item to be collected, however, execution time of each process is always included. In this example, a general-purpose application 101B, "XXXX.exe", to be used on the general-purpose OS 102B is designated. A DMA process is included in the general-purpose application 101B designated. And, information on DMA process start time, DMA process end time, number of DMA processes, and a DMA transfer size collected of the general-purpose application 101B designated are saved. Information such as a CPU usage rate and the like collected in relation to a load other than a DMA are also saved.

An example of the threshold table 302 is illustrated in FIG. 7. An execution condition for determining whether or not a restriction is necessary in an execution method of a process of the general-purpose OS 102B, and a tuning method for placing the restriction are designated in the threshold table 302. In this example, how to place a restriction on the CPU usage rate when the CPU usage rate exceeds a threshold of "70%" is designated. When DMA transfer time exceeds an interrupt cycle of the real-time OS 102A, how to place a restriction on execution of a DMA transfer process depending on whether or not a ratio of excess time exceeds a threshold of "20%" is also designated. A restriction item and a restriction value may arbitrarily be decided by the user.

An example of the tuning table 303 is illustrated in FIG. 8. A parameter value to be used for placing a restriction on a process of the general-purpose OS 102B calculated by the hypervisor 103 is recorded in the tuning table 303. In this example, the tuning method for placing a restriction and a parameter value, "αHz", calculated with regard to the general-purpose application 101B, "XXXX.exe", to be used on the general-purpose OS 102B are recorded.

*Description of Operation*

Operation of the information processing apparatus 100 according to this embodiment will be described by referring to FIG. 9 to FIG. 13. The operation of the information processing apparatus 100 corresponds to the tuning method according to this embodiment.

There are roughly four phases in an execution procedure of tuning. Specifically, there are a preparation phase for test operation by a user illustrated in FIG. 9, a system test operation phase of the hypervisor 103 illustrated in FIG. 10, an analysis and tuning phase of the hypervisor 103 illustrated in FIG. 11 and FIG. 12, and an actual operation phase illustrated in FIG. 13.

Figure 9:
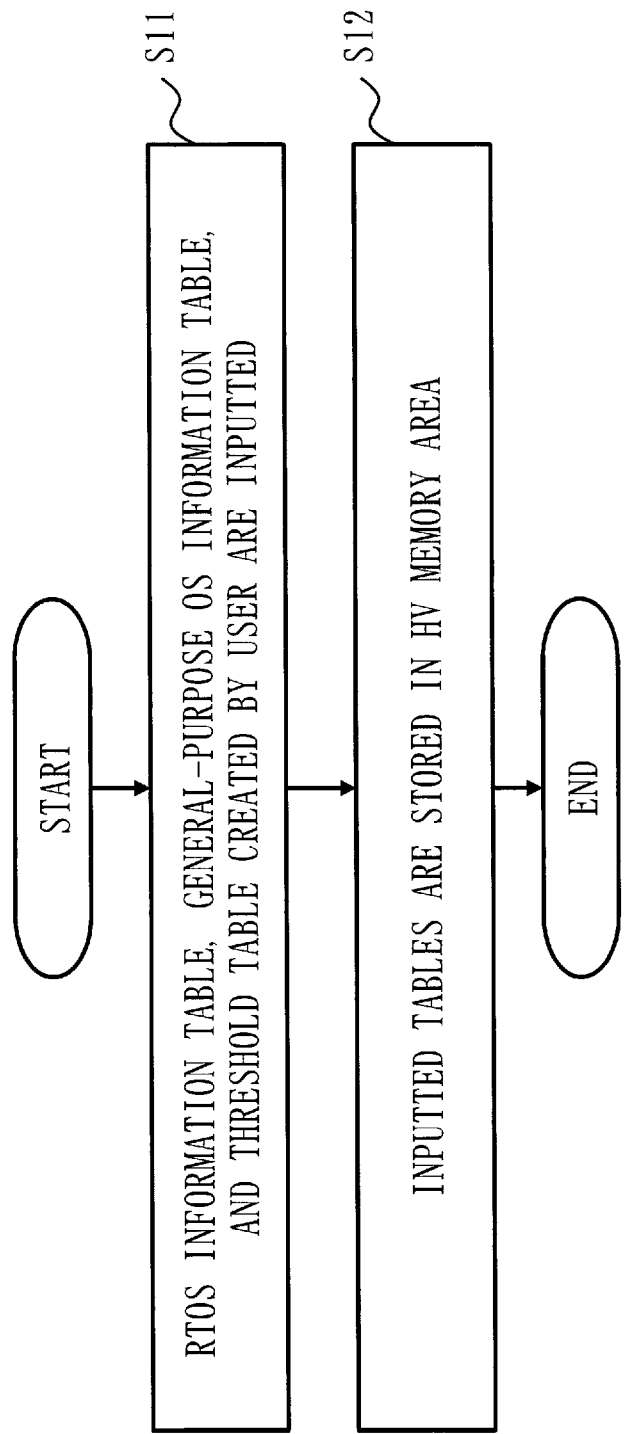
FIG. 9 is a flowchart illustrating operation of the information processing apparatus according to Embodiment 1.

The preparation phase for test operation by a user will be described by referring to FIG. 9.

In step S11 the RTOS information table 300, the general-purpose OS information table 301, and the threshold table 302 created by the user are inputted.

In step S12, the three tables inputted in step S11 are stored in the HV memory area 108C to be used by the hypervisor 103.

Figure 10:
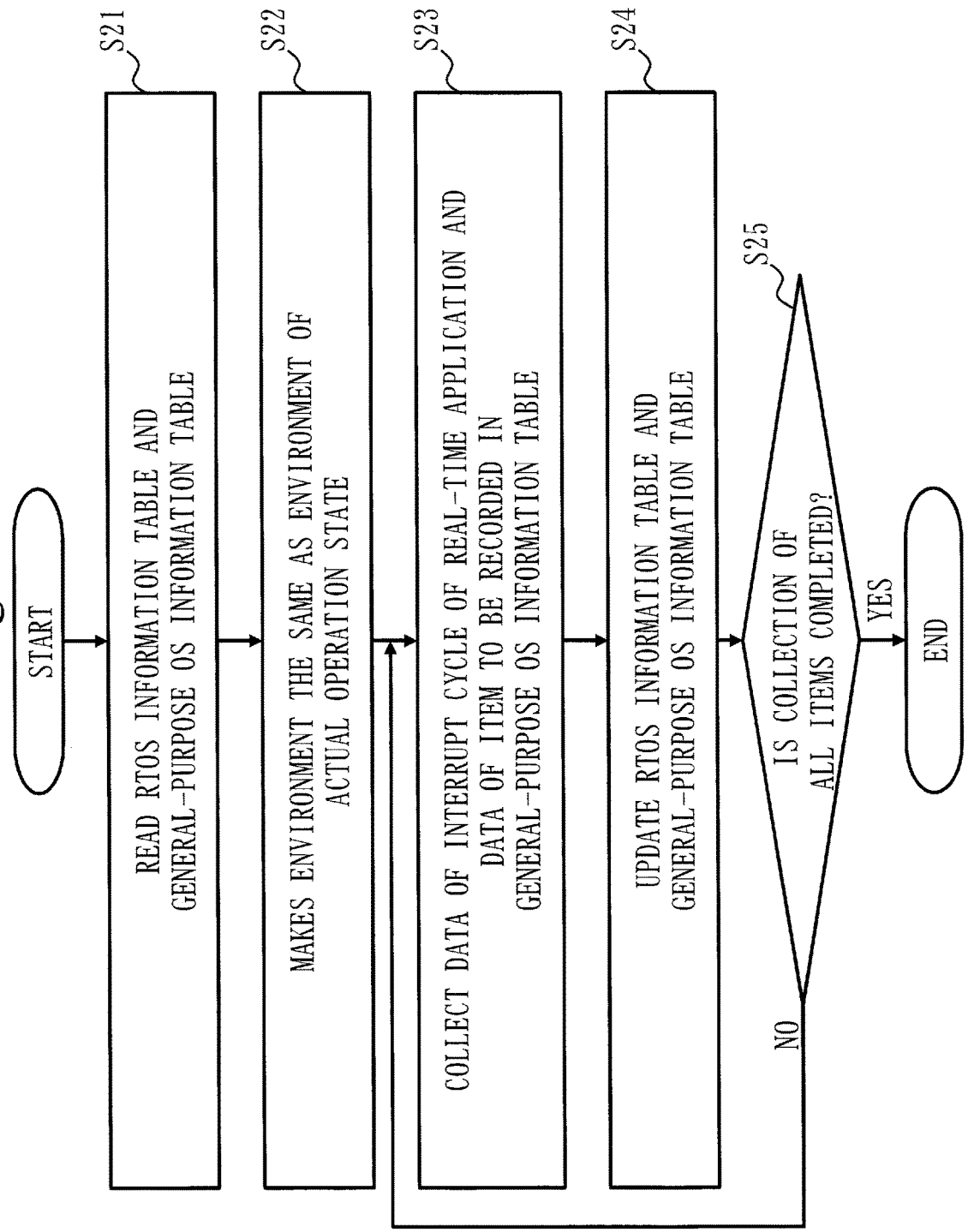
FIG. 10 is a flowchart illustrating operation of the information processing apparatus according to Embodiment 1.

The system test operation phase of the hypervisor 103 will be described by referring to FIG. 10.

Assume that the user put power of the information processing apparatus 100 on and started the system test operation phase of the hypervisor 103.

In step S21, the data reading unit 221 of the management unit 220 reads the RTOS information table 300 and the general-purpose OS information table 301 from the HV memory area 108C.

In step S22, the management unit 220 executes all applications to be executed in the actual operation phase and makes an environment the same as an environment of an actual operation state. The applications to be executed includes, for example, an application to copy data into the memory 108, an application to obtain sensor information, and an application to analyze data. These applications are executed for a purpose of obtaining information regarding a utilization situation of an I/O when the system is actually running. If the purpose can be achieved, only some of the applications may be executed instead of executing all applications.

In step S23, the first obtaining unit 200, the first control unit 210, the second obtaining unit 230, and the second control unit 240 collect various types of data from a time of test operation for the item recorded in the RTOS information table 300 and the general-purpose OS information table 301. Specifically, four processes hereinafter are performed in parallel.

As a first process, the first obtaining unit 200 obtains an application name of the real-time application 101A currently in operation and a value of the interrupt cycle of the real-time OS 102A.

More specifically, the interrupt detection unit 201 of the first obtaining unit 200 detects that a cyclic interrupt is issued for the real-time OS 102A. When the interrupt detection unit 201 detects that there is a cyclic interrupt, the cycle obtaining unit 202 of the first obtaining unit 200 obtains the value of the cycle.

As a second process, the first control unit 210 obtains an application name of the general-purpose application 101B currently in operation and a value of a CPU usage rate which is a usage rate of the second core 104B operating the general-purpose OS 102B.

More specifically, the usage rate obtaining unit 211 of the first control unit 210 obtains a value of the CPU usage rate of the second core 104B that the general-purpose OS 102B that is running is to use.

As a third process, the second obtaining unit 230 obtains the application name of the general-purpose application 101B currently in operation and a value of execution time of the general-purpose application 101B.

More specifically, the request detection unit 231 of the second obtaining unit 230 detects that execution of the general-purpose application 101B is started for the general-purpose OS 102B that is running, and records execution start time of the general-purpose application 101B in the memory 108. The end detection unit 232 of the second obtaining unit 230 detects that the execution of that general-purpose application 101B ended, and records execution end time of the general-purpose application 101B in the memory 108. The end detection unit 232 calculates the execution time which is a difference between the execution start time and the execution end time.

As a fourth process, the second control unit 240 obtains the application name of the general-purpose application 101B currently in operation and values of a transfer data size per transfer, transfer process start time, transfer process end time, and number of transfer requests of a DMA transfer that the general-purpose OS 102B executes.

More specifically, the instruction detection unit 241 of the second control unit 240 detects that the general-purpose OS 102B that is running is requesting a DMA instruction, and starts the size obtaining unit 242. The size obtaining unit 242 of the second control unit 240 obtains a value of a data size of the DMA that is being requested and a value of a current transfer size per transfer. The time obtaining unit 244 of the second control unit 240 obtains values of the process start time and the process end time of the DMA. The frequentness obtaining unit 245 of the second control unit 240 obtains a value of number of processes which is frequentness of the DMA transfer that has been requested per unit of time.

In obtaining each value from the first process to the fourth process, register information of the processor 104, register information of the DMA controller 120, and when supported, a hypervisor call or a system call of the OS are used.

In step S24, the data updating unit 223 of the management unit 220 saves the data collected in step S23 in the RTOS information table 300 and the general-purpose OS information table 301.

Specifically, the data updating unit 223 receives the application name and the value of the interrupt cycle from the first obtaining unit 200. The data updating unit 223 saves the application name and the value of the interrupt cycle received in the RTOS information table 300. The data updating unit 223 receives the application name and the value of the CPU usage rate from the first control unit 210. The data updating unit 223 receives the application name and the value of the execution time from the second obtaining unit 230. The data updating unit 223 receives from the second control unit 240, the application name and with regard to the DMA transfer, the transfer data size per transfer, the transfer process start time, the transfer process end time, and the value of the number of transfer requests. The data updating unit 223 saves in the general-purpose OS information table 301, the application name, the value of the CPU usage rate, the value of the execution time, and with regard to the DMA transfer, the transfer data size per transfer, the transfer process start time, the transfer process end time, and the value of the number of transfer requests.

More specifically, the data updating unit 223 writes into the RTOS information table 300, the value of the cycle obtained by the cycle obtaining unit 202 along with a name of a corresponding real-time application 101A. The data updating unit 223 writes into the general-purpose OS information table 301, the value of the CPU usage rate obtained by the usage rate obtaining unit 211 along with a name of a corresponding the general-purpose application 101B. The data updating unit 223 further writes into the general-purpose OS information table 301, the value of the execution time calculated by the end detection unit 232 along with a name of a corresponding general-purpose application 101B. The data updating unit 223 further writes into the general-purpose OS information table 301, the value of the transfer size obtained by the size obtaining unit 242, the values of the process start time and the process end time obtained by the time obtaining unit 244, and the value of the number of processes obtained by the frequentness obtaining unit 245 along with a name of a corresponding general-purpose application 101B.

In step S25, when evaluation on all items in the RTOS information table 300 and the general-purpose OS information table 301 is not completed, the processes in and after step S23 are repeated. When the evaluation is completed, the system test operation phase of the hypervisor 103 ends.

Figure 11:
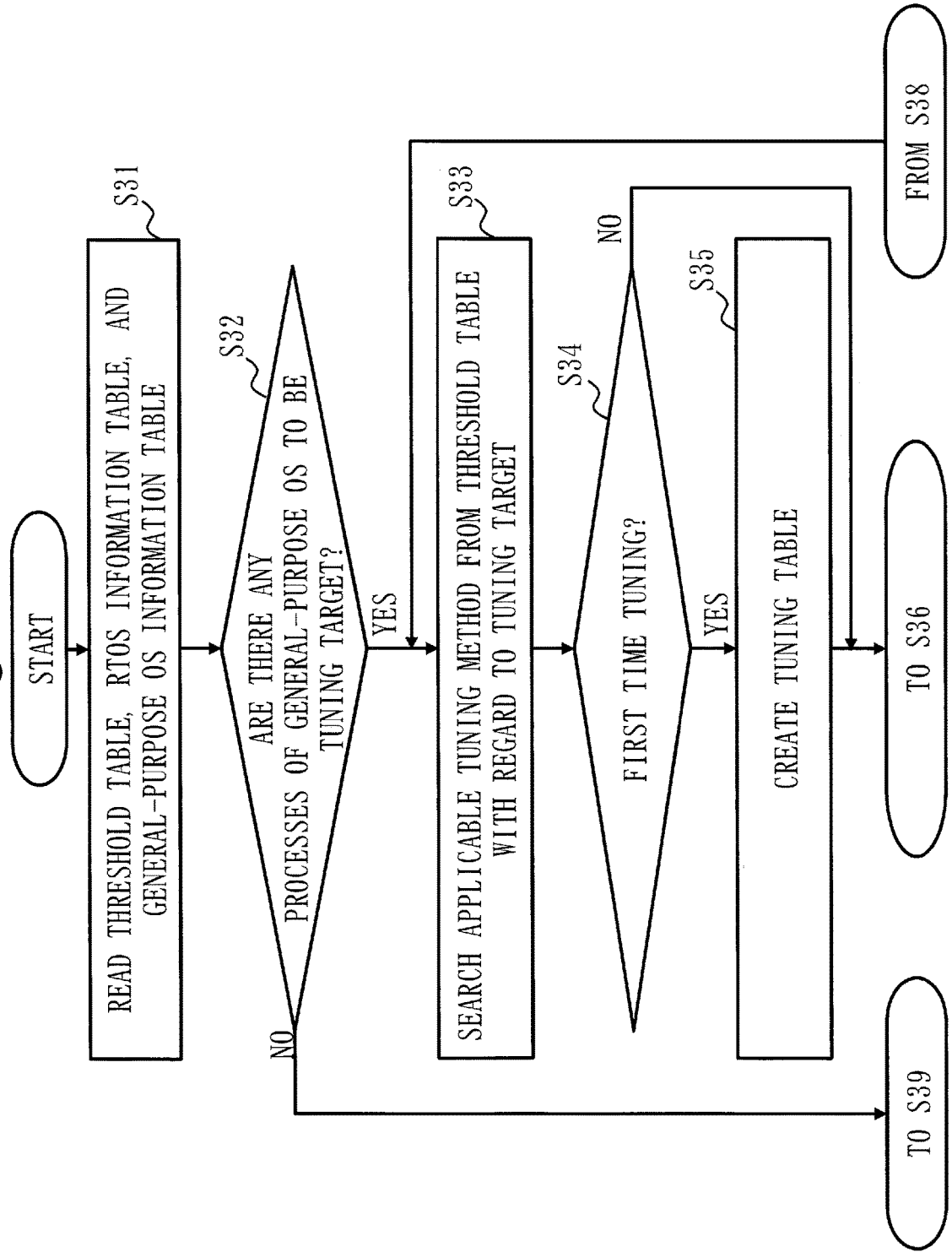
FIG. 11 is a flowchart illustrating operation of the information processing apparatus according to Embodiment 1.
Figure 12:
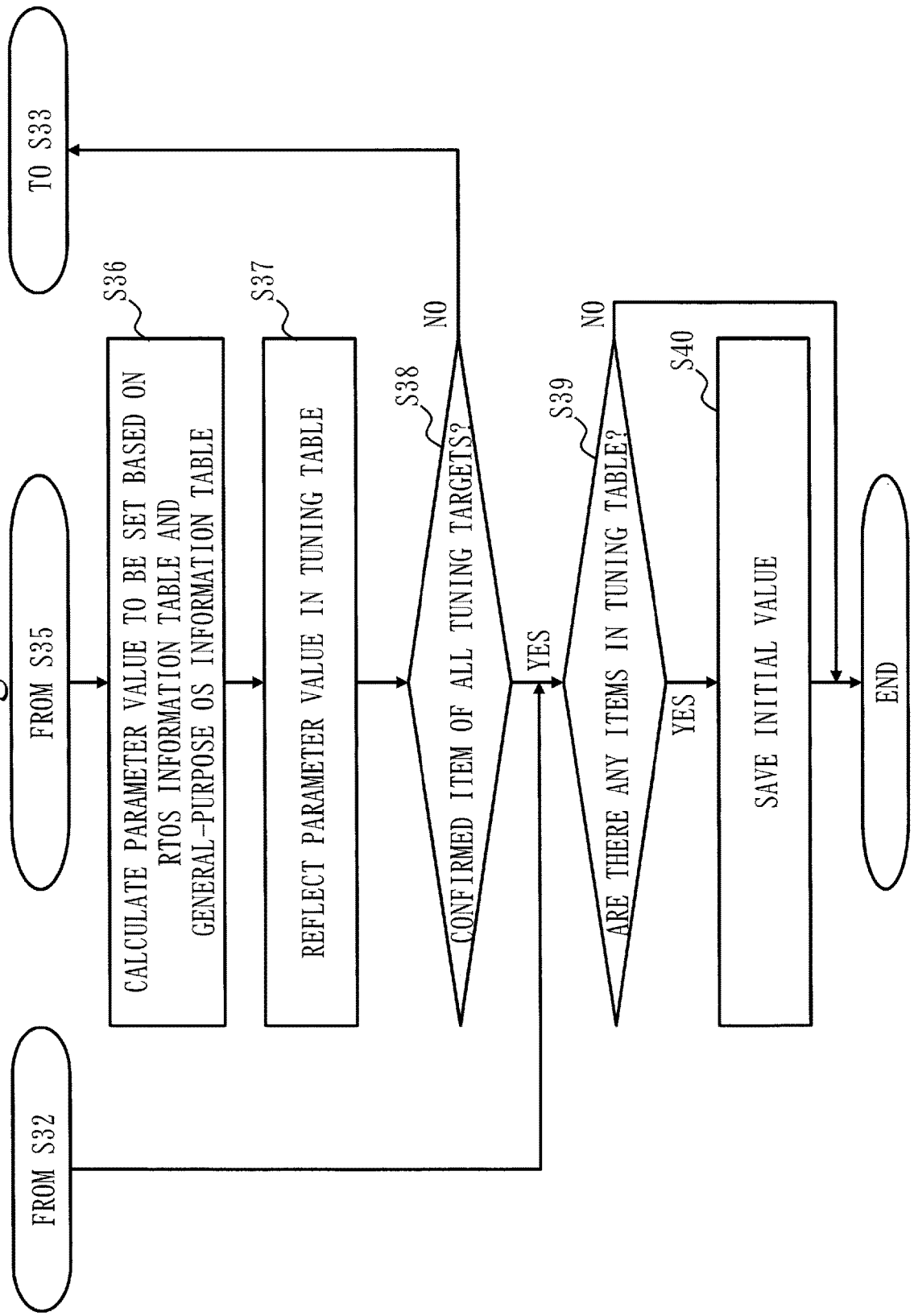
FIG. 12 is a flowchart illustrating operation of the information processing apparatus according to Embodiment 1.

The analysis and tuning phase of the hypervisor 103 will be described by referring to FIG. 11 and FIG. 12.

In step S31, the data reading unit 221 of the management unit 220 reads the threshold table 302, and the RTOS information table 300 and the general-purpose OS information table 301 updated in the system test operation phase of the hypervisor 103.

In step S32, the data comparison unit 222 of the management unit 220 compares the RTOS information table 300 with the general-purpose OS information table 301 and verifies whether or not a process of the general-purpose OS 102B is overlapping a time when a periodical interrupt of the real-time OS 102A occurs, for all of the processes of the general-purpose OS 102B. A process that is overlapping is determined as a process that needs tuning, that is, a tuning target. For example, when a general-purpose application 101B is in the process of performing a memory copy when an interrupt is being issued in the real-time OS 102A, the general-purpose application 101B is determined as the tuning target. When a tuning target is detected, processes in step S33 are performed. When there is no tuning target, processes in step S39 are performed.

In step S33, the data comparison unit 222 determines, with regard to the tuning target, which item exceeds the threshold by comparing the threshold table 302 with the general-purpose OS information table 301. For an item exceeding the threshold, the data comparison unit 222 identifies the tuning method written in the threshold table 302.

In step S34, in a case of first time tuning, processes in step S35 are performed. In a case of tuning from a second time onwards, processes in step S36 are performed.

In step S35, the table creation unit 224 of the management unit 220 creates the tuning table 303 in the HV memory area 108C. Then, processes in step S36 are performed.

In step S36, the parameter value calculation unit 225 of the management unit 220 calculates the parameter value to be set in the tuning table 303 based on information in the RTOS information table 300 and the general-purpose OS information table 301. A calculation of the parameter value is performed based on how the parameter value of the process of the general-purpose OS 102B can be changed so that the process will not be overlapping the interrupt cycle of the real-time OS 102A.

In step S37, the data updating unit 223 of the management unit 220 reflects the parameter value calculated in step S36 in the tuning table 303.

In step S38, the data comparison unit 222 verifies whether or not confirmation on existence or non-existence of an item that satisfies the execution condition in the threshold table 302 is completed for all of the tuning targets and whether or not there is any remaining case. When a tuning target that the confirmation is not yet completed is remaining, the processes in and after step S33 are repeated. When the confirmation on all of the tuning targets is completed, processes in step S39 are performed.

In step S39, when there is an item in the tuning table 303, processes in step S40 are performed. When there is no item in the tuning table 303, the analysis and tuning phase of the hypervisor 103 ends.

In step S40, the first control unit 210 and the second control unit 240 obtains a current value that corresponds to the parameter value reflected in each item in the tuning table 303. The data updating unit 223 of the management unit 220 saves the value obtained by the first control unit 210 and the second control unit 240 in the HV memory area 108C as an initial value. After saving the initial value, the analysis and tuning phase of the hypervisor 103 ends.

An example where the CPU usage rate is exceeding the execution condition designated in the threshold table 302 will be described. Assume that a method to reduce CPU frequency of the second core 104B that the general-purpose application 101B uses is to be used as a restriction method.

In step S33, the data comparison unit 222 detects that the CPU usage rate is exceeding the value in the threshold table 302. Then, in step S36, the parameter value calculation unit 225 decides on which CPU frequency to set based on the information in the RTOS information table 300 and the general-purpose OS information table 301 so that the process of the second core 104B does not affect the real-time application 101A. That is, the parameter value calculation unit 225 calculates a CPU frequency after a change has been made to the CPU frequency. In step S37, the data updating unit 223 reflects a result of the calculation of the parameter value calculation unit 225 in the tuning table 303.

Since the change in the CPU frequency is set in the tuning table 303, the frequency obtaining unit 212 of the first control unit 210 obtains a value of current CPU frequency in step S40. The data updating unit 223 saves the value obtained by the frequency obtaining unit 212 in the HV memory area 108C as a value of CPU frequency before the change, that is, the initial value.

As described above, when an execution condition of the CPU frequency is satisfied, tuning setting of the CPU frequency is performed. Tuning setting of other operation states can be performed similarly. That is, in this embodiment, when there is an item that satisfies an "execution condition" in the threshold table 302 that the user creates in the data of the general-purpose OS information table 301 that has been updated by the data updating unit 223, a "tuning method" which is a restriction designated in the threshold table 302 is applied to an application that is applicable in the general-purpose OS 102B. A summary of the restriction becomes the tuning table 303.

In the example in FIG. 6, a result of "XXXX.exe" updated by the data updating unit 223 is retained as table information. In this example, "XXXX.exe" has executed the DMA transfer three times between time of 0x10 to 0x20. The CPU usage rate is 80% and disk access time is 1 ms. In a tuning phase, this result is compared with the execution condition in the threshold table 302. Specifically, whether or not the CPU usage rate is exceeding the execution condition of 70% is determined. The hypervisor 103 places a restriction on execution of the application, "XXXX.exe", so that the CPU usage rate becomes 70% or lower. And, whether or not an interrupt of the real-time OS 102A occurs between the time of 0x10 to 0x20 during which the DMA transfer is performed is determined. If the interrupt occurs, and when the time is equal to or more than the interrupt cycle of the real-time OS 102A and is +20% or less, tuning is set where the transfer size per transfer of the DMA transfer is made small so that the DMA transfer does not overlap the time when the interrupt occurs. When DMA transfer time is equal to or more than the interrupt cycle of the real-time OS 102A and is +20% or more, tuning is set where all DMA transfers are converted to PIO. The summary of the restriction on these application executions is the tuning table 303. "PIO" is an abbreviation for Programmed I/O.

Figure 13:
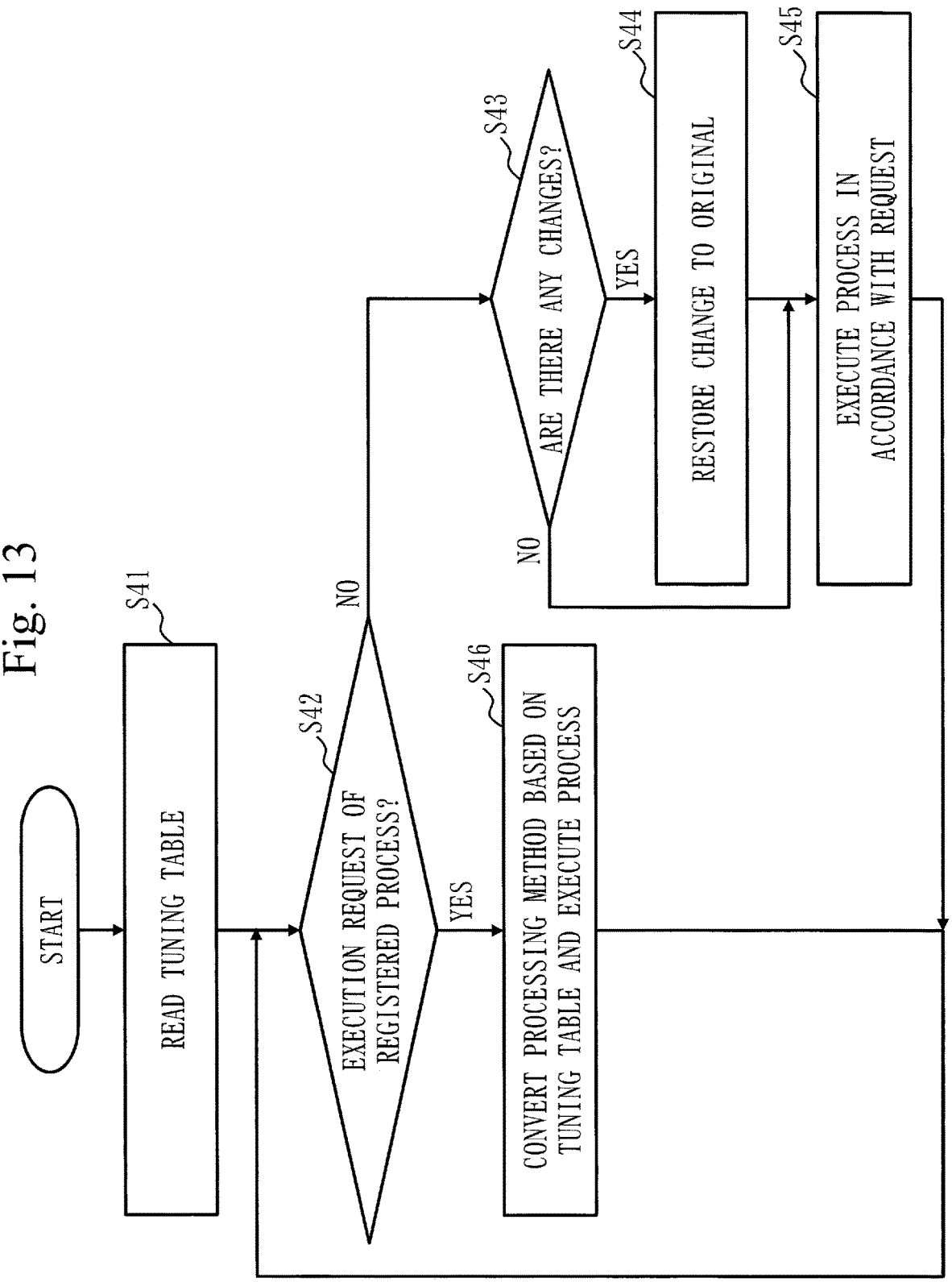
FIG. 13 is a flowchart illustrating operation of the information processing apparatus according to Embodiment 1.

The actual operation phase will be described by referring to FIG. 13.

In step S41, the data reading unit 221 of the management unit 220 reads the tuning table 303.

In step S42, the data comparison unit 222 of the management unit 220 detects an execution request of a process from the general-purpose application 101B and confirms whether or not an item corresponding to the process is registered in the tuning table 303. When registered, processes in step S46 are performed. When not registered, processes in step S43 are performed.

In step S43, the first control unit 210 and the second control unit 240 obtains the current value that corresponds to the parameter value reflected in each item in the tuning table 303. The data comparison unit 222 compares the value obtained by the first control unit 210 and the second control unit 240 with the initial value saved in step S40, and confirms whether or not there is any change from the initial value. When there is a change, processes in step S44 are performed. When there is no change, processes in step S45 are performed.

As one example, when the parameter value is a value of the CPU frequency, the frequency obtaining unit 212 of the first control unit 210 obtains the value of the current CPU frequency. The data comparison unit 222 compares the value of the CPU frequency obtained by the frequency obtaining unit 212 with the initial value saved in step S40, and confirms whether or not any change has been made to the CPU frequency.

As another example, when the parameter value is the value of the transfer size per transfer of the DMA transfer, the size obtaining unit 242 of the second control unit 240 obtains a value of a current transfer size per transfer of the DMA transfer. The data comparison unit 222 compares the value of the transfer size obtained by the size obtaining unit 242 with the initial value saved in step S40, and confirms whether or not any change has been made to the transfer size.

In step S44, the first control unit 210 or the second control unit 240 restores the changes from the initial value to the original. Then, processes in step S45 are performed.

As one example, when the CPU frequency has been changed, the frequency changing unit 213 of the first control unit 210 restores the CPU frequency to be used in the general-purpose application 101B to the CPU frequency before the change saved in step S40 by using the clock generator 107.

As another example, when the transfer size per transfer of the DMA transfer has been changed, the size changing unit 243 of the second control unit 240 restores the transfer size per transfer of the DMA transfer to be used in the general-purpose application 101B to the transfer size before the change saved in step S40 by using the DMA controller 120.

In step S45, processes are executed in accordance with the request from the general-purpose application 101B.

In step S46, with regard to the execution request of a process from the general-purpose application 101B, the data comparison unit 222 converts the instruction so that the process is performed with a restriction being placed according to a method designated in the tuning table 303. Then, the process is executed according to a method for after being converted.

As one example, when the CPU frequency is to be changed, the frequency changing unit 213 changes the CPU frequency to be used in the general-purpose application 101B to CPU frequency designated in the tuning table 303 by using the clock generator 107.

As another example, when the transfer size per transfer of the DMA transfer is to be changed, the size changing unit 243 changes the transfer size per transfer of the DMA transfer to be used in the general-purpose application 101B to a transfer size designated in the tuning table 303 by using the DMA controller 120.

Then, procedures from step S42 to step S46 are executed repeatedly until all the applications are completed.

Description Of Effect Of Embodiment

In this embodiment, obtaining units such as the first obtaining unit 200 and the second obtaining unit 230 obtain general-purpose OS information in a test operation phase where the real-time application 101A and the plurality of general-purpose applications 101B are executed. The general-purpose OS information is information on use of the hardware by each of the plurality of general-purpose applications 101B executed in the test operation phase, and is registered in the general-purpose OS information table 301. Each general-purpose application 101B is identified by "application name" in the general-purpose OS information table 301. The management unit 220 verifies, for each general-purpose application 101B, whether or not a condition for placing a restriction on the use of the hardware is satisfied based on the general-purpose OS information obtained by the obtaining unit. This condition is defined in the threshold table 302 as "execution condition". When the condition is verified as being satisfied, the management unit 220 places a restriction on the use of the hardware for an applicable general-purpose application 101B in the actual operation phase where the real-time application 101A and the plurality of general-purpose applications 101B are executed. The method for this restriction is defined in the threshold table 302 as "tuning method".

As described above, in this embodiment, for the general-purpose application 101B among the plurality of general-purpose applications 101B that is verified as satisfying a certain condition based on the information obtained in the test operation phase, the use of the hardware in the actual operation phase is restricted. By not placing a restriction on the use of the hardware in the actual operation phase for the general-purpose application 101B that is verified as not satisfying the condition, the real-time OS 102A can be made to preferentially access the hardware without stopping processes of the general-purpose OS 102B that does not affect a process of the real-time OS 102A.

In this embodiment, the obtaining unit obtains the general-purpose OS information for each type of hardware. The management unit 220 verifies whether or not the condition is satisfied based on the general-purpose OS information for each combination of the general-purpose application 101B and the type of hardware. The type of hardware is defined in the threshold table 302 as "category". When the management unit 220 verified that the condition is satisfied, the management unit 220 places a restriction on use of the hardware of an applicable type for the applicable general-purpose application 101B in the actual operation phase.

When the processor 104 is available as the type of hardware, the obtaining unit obtains information indicating a utilization rate of the processor 104 as the general-purpose OS information. The utilization rate of the processor 104 is recorded in the general-purpose OS information table 301 as "CPU usage rate". For each of the general-purpose application 101B, when the utilization rate of the processor 104 indicated in the general-purpose OS information is equal to or more than the threshold, the management unit 220 verifies that the condition with regard to the processor 104 is satisfied. As a method to place a restriction on use of the processor 104, an arbitrary method may be used, but in this embodiment, when the management unit 220 verified that the condition is satisfied, the management unit 220 lowers frequency of the processor 104 at a time when the applicable general-purpose application 101B is executed in the actual operation phase.

When the memory 108 is available as the type of hardware, the obtaining unit obtains information indicating an execution period of the DMA transfer to the memory 108 as the general-purpose OS information. The execution period of the DMA transfer to the memory 108 is recorded as a combination of "DMA process start time" and "DMA process end time" in the general-purpose OS information table 301. For each general-purpose application 101B, when the execution period of the DMA transfer to the memory 108 indicated in the general-purpose OS information is overlapping the interrupt cycle of the real-time OS 102A, the management unit 220 verifies that the condition is satisfied. The interrupt cycle of the real-time OS 102A is detected in advance and is recorded in the RTOS information table 300. As a method to place a restriction on the DMA transfer to the memory 108, an arbitrary method may be used, but in this embodiment, when the management unit 220 verified that the condition is satisfied, the management unit 220 changes the method depending on a degree of overlap between the execution period of the DMA transfer to the memory 108 indicated in the general-purpose OS information and the interrupt cycle of the real-time OS 102A. Specifically, when the degree of overlap between the execution period of the DMA transfer to the memory 108 indicated in the general-purpose OS information and the interrupt cycle of the real-time OS 102A is equal to or more than the threshold, the management unit 220 makes a transmission size of the DMA transfer to the memory 108 by the applicable general-purpose application 101B small. When the degree of overlap between the execution period of the DMA transfer to the memory 108 indicated in the general-purpose OS information and the interrupt cycle of the real-time OS 102A is lower than the threshold, the management unit 220 changes the DMA transfer to the memory 108 by the applicable general-purpose application 101B to a PIO transfer.

When a disc that corresponds to the auxiliary storage device as described above is available as the type of hardware, the obtaining unit obtains information indicating an execution period of an access to the disc as the general-purpose OS information. The execution period of the access to the disc is recorded as "disc access time" in the general-purpose OS information table 301. When the execution period of the access to the disc indicated in the general-purpose OS information is overlapping the interrupt cycle of the real-time OS 102A, the management unit 220 verifies, for each general-purpose application 101B, that the condition is satisfied. The interrupt cycle of the real-time OS 102A is detected in advance and is recorded in the RTOS information table 300. As a method to place a restriction on the access to the disc, an arbitrary method may be used, but in this embodiment, when the management unit 220 verified that the condition is satisfied, the management unit 220 makes a block size of the access to the disc by the applicable general-purpose application 101B small.

As described above, in this embodiment, for the general-purpose application 101B verified as satisfying a certain condition based on the information obtained in the test operation phase among the plurality of general-purpose applications 101B, the use of the hardware of a type corresponding to the condition is restricted in the actual operation phase. When the type of hardware corresponding to the condition is the memory 108, access frequentness of the general-purpose application 101B to the memory 108 is possible to be reduced by changing a method to execute the general-purpose application 101B. As a result, an occupancy rate of the bus 110 by the general-purpose application 101B is lowered, waiting time of the real-time application 101A via the bus 110 is resolved in an environment where the operation of the general-purpose application 101B is also continuing, and a delay in real-time response performance is possible to be prevented.

Tuning may also be performed on the use of the hardware other than the CPU frequency, a usage rate of the DMA, and a disc access, with a similar method based on device access process time and a process size.

The obtaining unit may obtain information indicating a utilization period of the memory 108 other than the execution period of the DMA transfer to the memory 108, or may obtain information indicating a utilization period of the type of hardware other than the memory 108, as the general-purpose OS information. In such a case, for each general-purpose application 101B, when a utilization period of hardware indicated in the general-purpose OS information is overlapping the interrupt cycle of the real-time OS 102A, the management unit 220 verifies that the condition is satisfied. When the management unit 220 verified that the condition is satisfied, the management unit 220 may change the method that places a restriction on the use of the hardware for the applicable general-purpose application 101B depending on a degree of overlap between the utilization period of hardware indicated in the general-purpose OS information and the interrupt cycle of the real-time OS 102A.

In this embodiment, different from the art described in Patent Literature 1, lowering of an interrupt response performance of an OS with a high priority that can occur by an OS with a low priority exclusively possessing a band of the bus 110 caused by a process load other than a process load of the DMA can be dealt with.

In this embodiment, reducing an impact on process precision of the real-time OS 102A is possible by the hypervisor 103 converting an execution method of a process without stopping the process of a general-purpose OS 102B with a low priority when a process load of an OS other than the real-time OS 102A is high.

According to this embodiment, in a case where the bus 110 is to be shared by the real-time OS 102A and the general-purpose OS 102B, it will be possible to prevent lowering of the real-time response performance at a time when a device allotted to the real-time OS 102A issues an interrupt.

*Other Configurations*

In this embodiment, the functions of the first obtaining unit 200, the first control unit 210, the management unit 220, the second obtaining unit 230, and the second control unit 240 are realized by software, but as a variation, the functions of the first obtaining unit 200, the first control unit 210, the management unit 220, the second obtaining unit 230, and the second control unit 240 may be realized by a combination of software and hardware. That is, a part of the functions of the first obtaining unit 200, the first control unit 210, the management unit 220, the second obtaining unit 230, and the second control unit 240 may be realized by dedicated hardware and the rest may be realized by software.

The dedicated hardware is, for example, a single circuit, a composite circuit, a programmed processor, a parallel programmed processor, a logic IC, a GA, an FPGA, an ASIC, or a combination of some or all of these. "IC" is an abbreviation for Integrated Circuit. "GA" is an abbreviation for Gate Array. "FPGA" is an abbreviation for Field-Programmable Gate Array. "ASIC" is an abbreviation for Application Specific Integrated Circuit.

Each of the processor 104 and the dedicated hardware is a processing circuitry. That is, regardless of whether or not the functions of the first obtaining unit 200, the first control unit 210, the management unit 220, the second obtaining unit 230, and the second control unit 240 are realized by software or a combination of software and hardware, operation of the first obtaining unit 200, the first control unit 210, the management unit 220, the second obtaining unit 230, and the second control unit 240 are performed by the processing circuitry.

Number of the OS's may be three or more. Each OS may be either one of the real-time OS 102A and the general-purpose OS 102B, or may be an OS of another type. For example, supposing that OS's of the same type are available, each may be distinguished from the other as an OS for management and an OS for non-management.

Number of cores of the processor 104 may be three or more.

The hypervisor 103 may be executed by the second core 104B.

The information processing apparatus 100 may include a core that executes the hypervisor 103 other than a core that executes the OS. That is, the hypervisor 103 may be executed by a core different from the core that that executes the OS.

The RTOS information table 300 and the general-purpose OS information table 301 that the user creates may be merged into one or may be created separately for each trigger of events such as the DMA, a memory access, and the disc access.

The hypervisor 103 may place a restriction not only on the general-purpose application 101B, but also on the process of the general-purpose OS 102B by performing process state monitoring of the real-time application 101A or by having threshold information regarding the real-time application 101A. For example, the hypervisor 103 may obtain information on a memory cache hit rate and a cache miss rate per unit of time of the real-time OS 102A, and when the cache miss rate is exceeding a prescribed threshold, the hypervisor 103 may place a restriction on allotting of a cache for the general-purpose application 101B.

Embodiment 2

Figure 14:
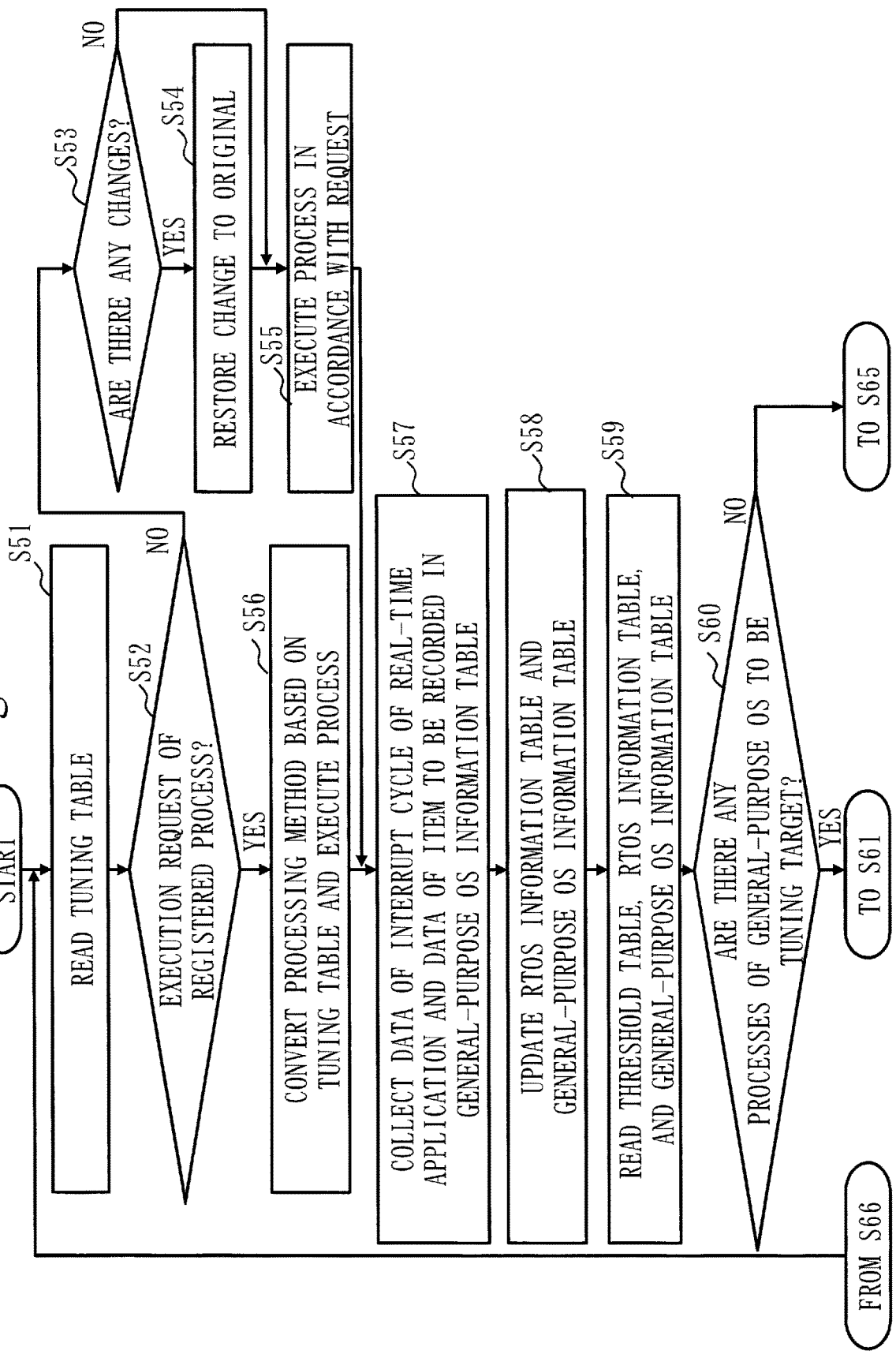
FIG. 14 is a flowchart illustrating operation of an information processing apparatus according to Embodiment 2.
Figure 15:
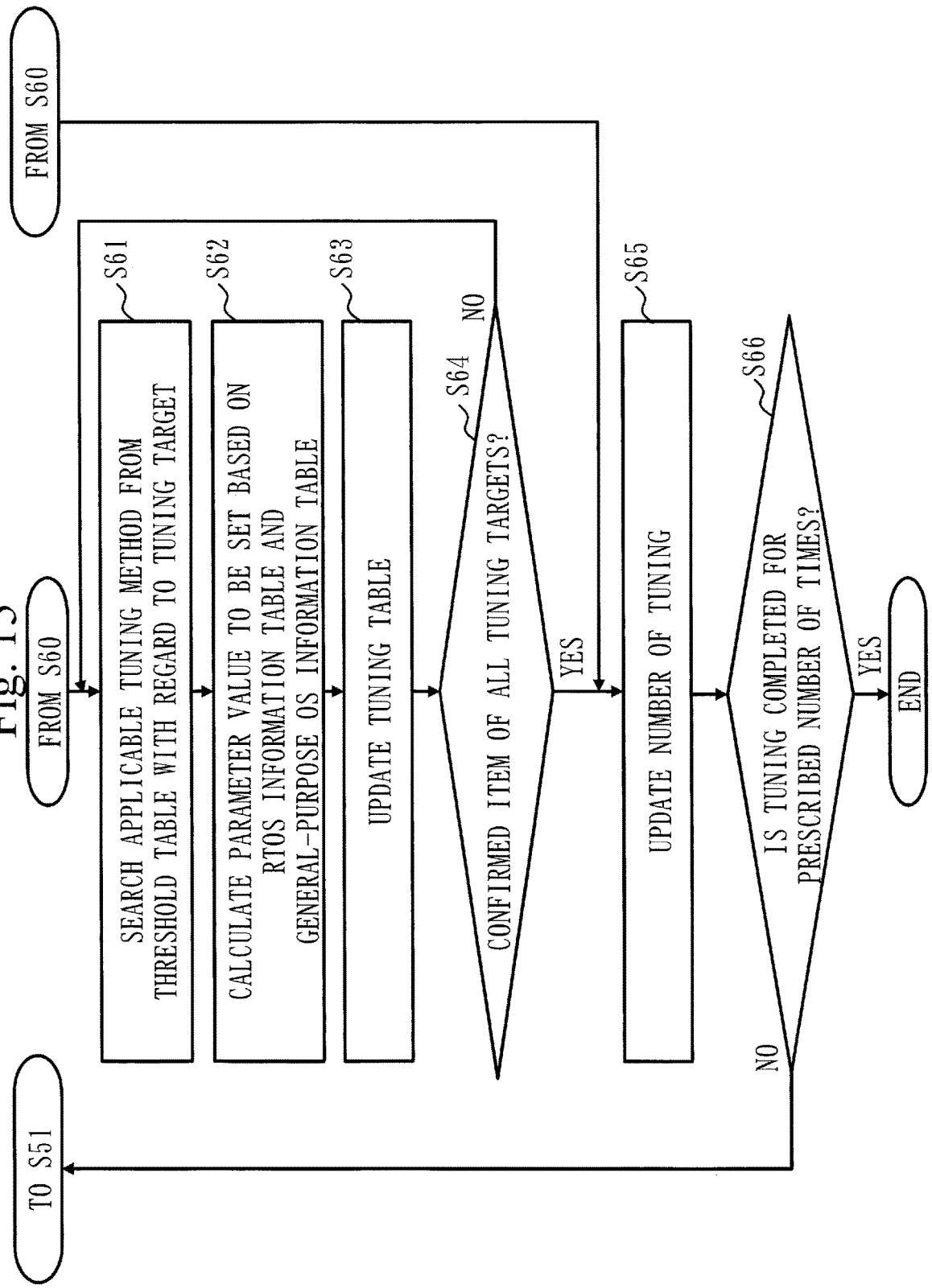
FIG. 15 is a flowchart illustrating operation of the information processing apparatus according to Embodiment 2.

With regard to this embodiment, difference from Embodiment 1 will mainly be described using FIG. 14 and FIG. 15.

In Embodiment 1, each of the system test operation phase of the hypervisor 103 and the analysis and tuning phase of the hypervisor 103 is executed only once. In this embodiment, test operation is performed again by using a set value in the tuning table 303 and the parameter is adjusted. This test operation may be performed by being repeated a plurality of times. In such a case, a method to designate number of test operation may be an arbitrary method, and the user may set the number of times by a parameter at a start of the test operation, or may be managed by the number of times being added to any piece of table information that the hypervisor 103 is able to read.

*Description of Configuration*

With regard to a configuration of an information processing apparatus 100 according to this embodiment, since the configuration is the same as that of Embodiment 1 illustrated in FIG. 1 to FIG. 3, the description will be omitted.

*Description of Operation*

Operation of the information processing apparatus 100 according to this embodiment will be described by referring to FIG. 14 and FIG. 15. The operation of the information processing apparatus 100 corresponds to a tuning method according to this embodiment.

With regard to the preparation phase for test operation by a user, a system test operation phase of the hypervisor 103 for a first time, an analysis and tuning phase of the hypervisor 103 for a first time, and the actual operation phase, since the phases are the same as those of Embodiment 1 illustrated in FIG. 9 to FIG. 13, the description will be omitted.

The system test operation phase and the analysis and tuning phase from a second time onwards will be described by referring to FIG. 14 and FIG. 15.

With regard to processes in step S51 to step S56, since the processes are the same as the processes in step S41 to step S46, the description will be omitted.

After processes in step S55 are performed, processes in step S57 are performed.

The processes in step S57 are performed also after the processes in step S56 are performed.

With regard to processes in step S57 and step S58, since the processes are the same as the processes in step S23 and step S24, the description will be omitted.

After the processes in step S58 are performed, processes in step S59 are performed.

With regard to the processes in step S59, since the processes are the same as the processes in step S31, the description will be omitted.

After the processes in step S59 are performed, processes in step S60 are performed.

In step S60, the data comparison unit 222 of the management unit 220 compares the RTOS information table 300 with the general-purpose OS information table 301 and verifies whether or not a process of the general-purpose OS 102B is overlapping the time that the periodical interrupt of the real-time OS 102A occurs, for all of the processes of the general-purpose OS 102B. The process that is overlapping is determined as the process that needs tuning, that is, the tuning target. When the tuning target is detected, processes in step S61 are performed. When there is no tuning target, processes in step S65 are performed.

In step S61, the data comparison unit 222 determines, with regard to the tuning target, which item exceeds the threshold by comparing the threshold table 302 with the general-purpose OS information table 301. For an item exceeding the threshold, the data comparison unit 222 identifies the tuning method written in the threshold table 302.

In step S62, the parameter value calculation unit 225 of the management unit 220 calculates the parameter value to be set in the tuning table 303 based on the information in the RTOS information table 300 and the general-purpose OS information table 301. The calculation of the parameter value is performed based on how the parameter value of the process of the general-purpose OS 102B can be changed so that the process will not be overlapping the interrupt cycle of the real-time OS 102A.

In step S63, the data updating unit 223 of the management unit 220 updates the parameter value reflected in the tuning table 303 to the parameter value calculated in step S62.

In step S64, the data comparison unit 222 verifies whether or not confirmation on existence or non-existence of an item that satisfies the execution conditions in the threshold table 302 is completed for all of the tuning targets and whether or not there is any remaining case. When a tuning target that the confirmation is not yet completed is remaining, the processes in and after step S61 are repeated. When the confirmation on all of the tuning targets is completed, processes in step S65 are performed.

In step S65, number of tuning is counted. A counter value of the number of tuning is stored in the HV memory area 108C.

In step S66, the data comparison unit 222 confirms by referring to the counter value of the number of tuning stored in the HV memory area 108C, whether or not the number of tuning has reached number of times that the user designated. When the number of tuning has reached the number of times, the system test operation phase and the analysis and tuning phase for a second time and onwards end. When the number of tuning has not reached the number of times, the processes in and after step S51 are repeated.

In a case where the system test operation phase and the analysis and tuning phase for the second time and onwards have ended, the actual operation phase is executed.

A specific example of the system test operation phase and the analysis and tuning phase for the second time and onwards will be described.

In this example, assume that the tuning setting to change the CPU frequency to αHz is already performed in the system test operation phase and the analysis and tuning phase for the first time as in the example in FIG. 8.

In step S52, the data comparison unit 222 of the management unit 220 detects the execution request of a process from the general-purpose application 101B and detects whether or not an item corresponding to the process is registered in the tuning table 303.

In step S54, the frequency changing unit 213 of the first control unit 210 restores the CPU frequency to be used in the general-purpose application 101B to the CPU frequency before the change saved in step S40 by using the clock generator 107.

In step S56, as for the execution request of a process from the general-purpose application 101B, the data comparison unit 222 converts the CPU frequency to αHz so that the process is performed by placing a restriction according to a method designated in the tuning table 303. Then, the process is executed.

In step S57, the first obtaining unit 200, the first control unit 210, the second obtaining unit 230, and the second control unit 240 collect various types of data from the time of test operation for the items recorded in the RTOS information table 300 and the general-purpose OS information table 301.

In step S58, the data updating unit 223 of the management unit 220 saves in the RTOS information table 300 and the general-purpose OS information table 301, the data collected in step S57.

In step S59, the data reading unit 221 of the management unit 220 reads the threshold table 302, and the RTOS information table 300 and the general-purpose OS information table 301 updated in step S58.

In step S60, the data comparison unit 222 compares the RTOS information table 300 with the general-purpose OS information table 301 and verifies whether or not a process of the general-purpose OS 102B is overlapping the time when the periodical interrupt of the real-time OS 102A occurs, for all of the processes of the general-purpose OS 102B. When the tuning target is detected even though the CPU frequency has been converted to αHz, processes in step S61 to step S63 are performed.

In step S62, the parameter value calculation unit 225 calculates the parameter value to be set in the tuning table 303 based on the information in the RTOS information table 300 and the general-purpose OS information table 301.

In step S63, the data updating unit 223 updates the parameter value reflected in the tuning table 303 to the parameter value calculated in step S62.

In step S64, when the confirmation on all of the tuning targets is completed, processes in step S65 are performed.

In step S65, the counter value of the number of tuning is incremented by 1.

In step S66, when the counter value of the number of tuning matches a value of the number of times that the user designated, the system test operation phase and the analysis and tuning phase end. When there is no match, the processes in and after step S51 are repeated.

Description Of Effect Of Embodiment

In this embodiment, the test operation phase is repeated a plurality of times. At an end of every round of the test operation phase, the management unit 220 verifies, for each general-purpose application 101B, whether or not the condition is satisfied based on the information obtained as the general-purpose OS information by the obtaining unit in the phase that has ended. When the management unit 220 verified that the condition is satisfied, the management unit 220 adjusts the parameter for placing a restriction on the use of the hardware for the applicable general-purpose application 101B. After all the test operation phases are completed, the management unit 220 places a restriction on the use of the hardware for the applicable general-purpose application 101B in the actual operation phase by using the parameter.

In this embodiment, by performing collection of states and analysis for a plurality of times and updating the tuning table 303, lowering of real-time response performance can be prevented with high precision, and it will be possible for the processing performance of the general-purpose application 101B to be realized as a process that uses a more suitable parameter at the time of preventing the lowering of the real-time response performance. By calculating an optimal operation frequency value, it will be possible to continue the operation of the general-purpose application 101B. As a result, the occupancy rate of the bus 110 by the general-purpose application 101B is lowered, the waiting time of the real-time application 101A via the bus 110 is resolved, and it will be possible to prevent the delay in the real-time response performance.

REFERENCE SIGNS LIST

100: information processing apparatus, 101A: real-time application, 101B: general-purpose application, 102A: real-time OS, 102B: general-purpose OS, 103: hypervisor, 104: processor, 104A: first core, 104B: second core, 105: frequency changing mechanism, 106: interrupt controller, 107: clock generator, 108: memory, 108A: memory area, 108C: HV memory area, 109: I/O device, 110: bus, 111: graphics device, 120: DMA controller, 200: first obtaining unit, 201: interrupt detection unit, 202: cycle obtaining unit, 210: first control unit, 211: usage rate obtaining unit, 212: frequency obtaining unit, 213: frequency changing unit, 220: management unit, 221: data reading unit, 222: data comparison unit, 223: data updating unit, 224: table creation unit, 225: parameter value calculation unit, 230: second obtaining unit, 231: request detection unit, 232: end detection unit, 240: second control unit, 241: instruction detection unit, 242: size obtaining unit, 243: size changing unit, 244: time obtaining unit, 245: frequentness obtaining unit, 300: RTOS information table, 301: general-purpose OS information table, 302: threshold table, 303: tuning table.

The invention claimed is:

1. An information processing apparatus comprising:
   computer hardware including at least one of a processor, a memory, an input/output (I/O) device, a graphics device, and a direct memory access (DMA) device; and
   processing circuitry to:
   obtain, in a test operation phase in which a real-time application that is an application program that operates with a real-time operating system by using the computer hardware, and a plurality of general-purpose applications, each of which is an application program that operates with a non-real-time operating system by using the computer hardware, are executed, general-purpose operating system (OS) information that is information on use of the computer hardware by each of the plurality of general-purpose applications, and
   verify whether or not a condition to place a restriction on the use of the computer hardware is satisfied for each general-purpose application based on the general-purpose OS information obtained, and when the condition is verified as being satisfied for an applicable general-purpose application, to place a restriction on the use of the computer hardware by the applicable general-purpose application in an actual operation phase in which the real-time application and the plurality of general-purpose applications are executed,
   wherein the condition, when satisfied, is indicative of a potential overlap during the actual operational phase of a utilization period of the computer hardware by the applicable general-purpose application and an interrupt cycle of the real-time application in connection with the computer hardware.

2. The information processing apparatus according to claim 1 further comprising:
   a plurality of different types of the computer hardware;
   wherein the processing circuitry
   obtains the general-purpose OS information for each type of the computer hardware, and
   verifies whether or not the condition is satisfied is verified for each combination of general-purpose application and type of the computer hardware based on the general-purpose OS information, and when the condition is verified as being satisfied for the combination of computer hardware of an applicable type and an applicable general-purpose application, places a restriction on use of the computer hardware of an applicable type for the applicable general-purpose application in the actual operation phase.

3. The information processing apparatus according to claim 1, wherein
   the computer hardware includes the processor, and
   wherein the processing circuitry
   obtains information indicating a utilization rate of the processor, as the general-purpose OS information, and
   verifies, for each general-purpose application, that the condition is satisfied with regard to the processor when the utilization rate of the processor indicated in the general-purpose OS information is equal to or more than a threshold.

4. The information processing apparatus according to claim 3,
   wherein the processing circuitry, when the condition is verified as being satisfied, lowers frequency of the processor when the applicable general-purpose application is executed in the actual operation phase.

5. The information processing apparatus according to claim 1,
   wherein the processing circuitry
   obtains information indicating a utilization period of the computer hardware as the general-purpose OS information, and
   verifies that, for each general-purpose application, the condition is satisfied when the utilization period of the computer hardware indicated in the general-purpose OS information is overlapping an interrupt cycle of the real-time operating system.

6. The information processing apparatus according to claim 5,
   wherein the processing circuitry, when the condition is verified as being satisfied, changes a method to place a restriction on the use of the computer hardware for the applicable general-purpose application depending on a degree of overlap between the utilization period of the computer hardware indicated in the general-purpose OS information and the interrupt cycle of the real-time operating system.

7. The information processing apparatus according to claim 1, wherein
   the computer hardware includes the memory, and
   wherein the processing circuitry
   obtains information indicating an execution period of a DMA transfer to the memory, as the general-purpose OS information, and
   verifies, for each general-purpose application, that the condition is being satisfied when the execution period of the DMA transfer to the memory indicated in the general-purpose OS information is overlapping the interrupt cycle of the real-time operating system.

8. The information processing apparatus according to claim 7,
   wherein the processing circuitry, when the condition is verified as being satisfied, decreases a transmission size of the DMA transfer to the memory by the applicable general-purpose application when the degree of overlap between the execution period of the DMA transfer to the memory indicated in the general-purpose OS information and the interrupt cycle of the real-time operating system is equal to or more than a threshold, or otherwise, changes the DMA transfer to the memory by the applicable general-purpose application to a PIO transfer.

9. The information processing apparatus according to claim 1, wherein
   the computer hardware includes a disc, and
   wherein the processing circuitry
   obtains information indicating an execution period of an access to the disc, as the general-purpose OS information, and
   verifies that, for each general-purpose application, the condition is satisfied when the execution period of the access to the disc indicated in the general-purpose OS information is overlapping an interrupt cycle of the real-time operating system.

10. The information processing apparatus according to claim 9, wherein the processing circuitry, when the condition is verified as being satisfied, decreases a block size of the access to the disc by the applicable general-purpose application.

11. The information processing apparatus according to claim 1, wherein
the test operation phase is repeated a plurality of times, and
wherein the processing circuitry, at an end of every round of the test operation phase, verifies, for each general-purpose application, whether or not the condition is satisfied based on the information obtained as the general-purpose OS information in a phase that has ended, and adjusts a parameter for placing a restriction on the use of the computer hardware for the applicable general-purpose application when the condition is verified as being satisfied, and after all of the test operation phases have ended, places a restriction on the use of the computer hardware for the applicable general-purpose application by using the parameter in the actual operation phase.

12. A tuning method comprising:
obtaining, in a test operation phase in which a real-time application that is an application program that operates with a real-time operating system by using computer hardware, and a plurality of general-purpose applications, each of which is an application program that operates with a non-real-time operating system by using the computer hardware, are executed, general-purpose operating system (OS) information that is information on use of the computer hardware by each of the plurality of general-purpose applications, by an obtaining unit; and
verifying whether or not a condition to place a restriction on the use of the computer hardware is satisfied, for each general-purpose application based on the general-purpose OS information obtained by the obtaining unit, and when the condition is verified as being satisfied for an applicable general-purpose application, placing a restriction on the use of the computer hardware by the applicable general-purpose application in an actual operation phase in which the real-time application and the plurality of general-purpose applications are executed, by a management unit,
wherein the computer hardware includes at least one of a processor, a memory, an input/output (I/O) device, a graphics device, and a direct memory access (DMA) device, and
the condition, when satisfied, is indicative of a potential overlap during the actual operational phase of a utilization period of the computer hardware by the applicable general-purpose application and an interrupt cycle of the real-time application in connection with the computer hardware.

13. A non-transitory computer readable medium storing a tuning program causing a computer comprising computer hardware to execute:
an obtaining procedure to obtain, in a test operation phase in which a real-time application that is an application program that operates with a real-time operating system by using computer hardware, and a plurality of general-purpose applications, each of which is an application program that operates with a non-real-time operating system by using the computer hardware, are executed, general-purpose operating system (OS) information that is information on use of the computer hardware by each of the plurality of general-purpose applications; and
a management procedure to verify whether or not a condition to place a restriction on the use of the computer hardware is satisfied for each general-purpose application based on the general-purpose OS information obtained by the obtaining procedure, and when the condition is verified as being satisfied for an applicable general-purpose application, to place a restriction on the use of the computer hardware by the applicable general-purpose application in an actual operation phase in which the real-time application and the plurality of general-purpose applications are executed,
wherein the computer hardware includes at least one of a processor, a memory, an input/output (I/O) device, a graphics device, and a direct memory access (DMA) device, and
the condition, when satisfied, is indicative of a potential overlap during the actual operational phase of a utilization period of the computer hardware by the applicable general-purpose application and an interrupt cycle of the real-time application in connection with the computer hardware.

* * * * *